(12) United States Patent
Weckerling et al.

(10) Patent No.: US 6,872,143 B2
(45) Date of Patent: *Mar. 29, 2005

(54) DRIVESHAFT WITH COUNTER-TRACK JOINT

(75) Inventors: Thomas Weckerling, Lohmar (DE); Stephan Maucher, Siegburg (DE); Anna Gremmelmaier, Sankt Augustin (DE); Herbert Taureg, Hennef (DE)

(73) Assignee: GKN Automotive GmbH (DE)

( * ) Notice: Subject to any disclaimer, the term of this patent is extended or adjusted under 35 U.S.C. 154(b) by 0 days.

This patent is subject to a terminal disclaimer.

(21) Appl. No.: 10/435,641

(22) Filed: May 9, 2003

(65) Prior Publication Data
US 2004/0005930 A1 Jan. 8, 2004

(30) Foreign Application Priority Data
May 10, 2002 (DE) .......................... 102 20 715

(51) Int. Cl.$^7$ ............................................. F16D 3/224
(52) U.S. Cl. ....................................... 464/145; 464/906
(58) Field of Search ................................ 464/145, 167, 464/906

(56) References Cited

U.S. PATENT DOCUMENTS

| 2,325,460 A | * | 7/1943 | Amberg ................... 464/145 X |
|---|---|---|---|
| 3,186,189 A | * | 6/1965 | Cull ........................... 464/145 |
| 3,475,924 A | * | 11/1969 | Aucktor ................... 464/145 X |
| 5,221,233 A | * | 6/1993 | Jacob ......................... 464/145 |
| 6,120,382 A | * | 9/2000 | Sone et al. ................. 464/145 |
| 2002/0077186 A1 | * | 6/2002 | Hosoya et al. ............. 464/145 |
| 2002/0193166 A1 | * | 12/2002 | Cermak ...................... 464/145 |
| 2004/0033837 A1 | * | 2/2004 | Weckerling et al. ........ 464/145 |

FOREIGN PATENT DOCUMENTS

WO WO 02/02960 A1 * 1/2002

* cited by examiner

Primary Examiner—Greg Binda

(57) ABSTRACT

A driveshaft having at least one counter-track joint, the joint having an outer joint part (11), an inner joint part (21), torque-transmitting balls (36) accommodated in pairs of tracks, and a ball cage with cage windows in which the balls are held in a common plane. First outer tracks and first inner tracks form first pairs of tracks which diverge from one another when viewed in a first axial direction towards the connection end of the inner joint part (21) and hold first balls. Second outer tracks and second inner tracks form second pairs of tracks which diverge from one another when viewed in a second axial direction towards the connection end of the outer joint part 11 and hold second balls. The first pairs of tracks are positioned radially opposite each other and the second pairs of tracks are positioned radially opposite each other.

10 Claims, 7 Drawing Sheets

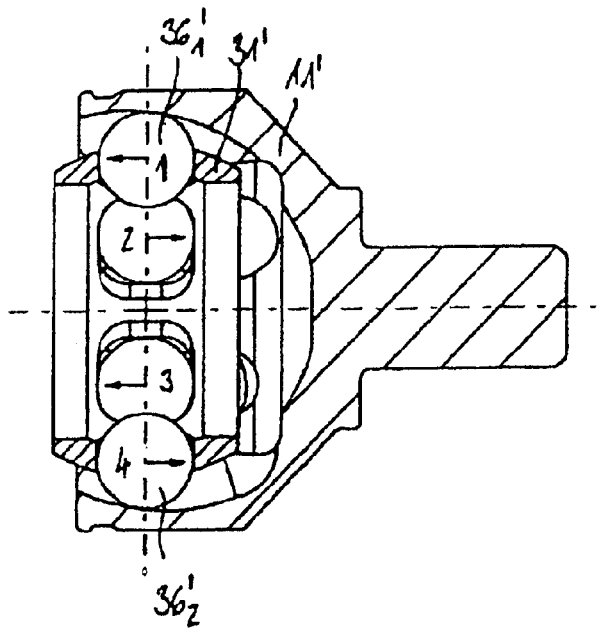
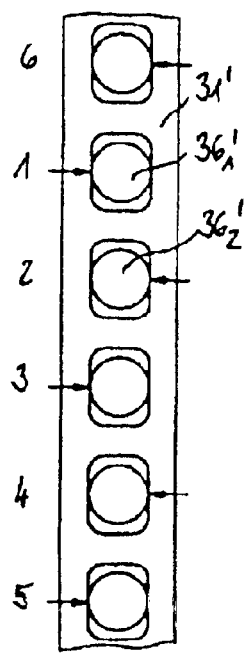
FIG. 3A
"PRIOR ART"
FIG. 3B
"PRIOR ART"
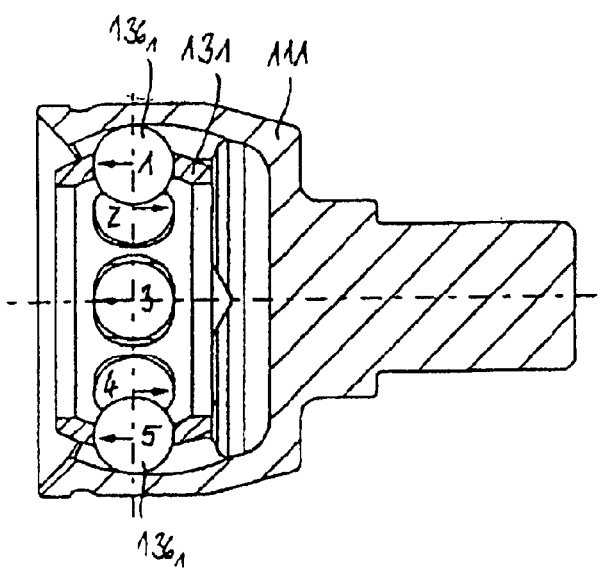
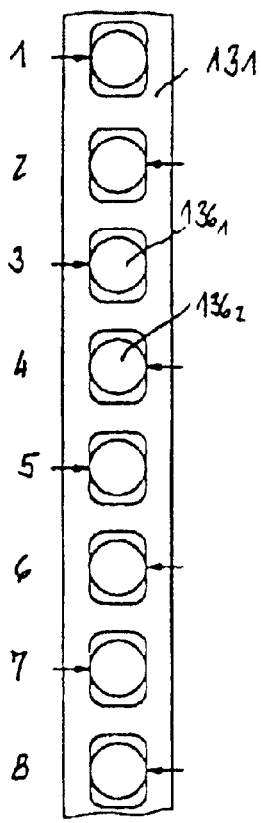
FIG. 6A
FIG. 6B

DRIVESHAFT WITH COUNTER-TRACK JOINT

TECHNICAL FIELD

The invention relates to a driveshaft having two constant velocity joints and an intermediate shaft, such as a sideshaft in a motor vehicle, wherein the driveshaft has at least one constant velocity fixed ball joint in the form of a counter-track joint. The counter-track joint comprises an outer joint part with outer tracks, an inner joint part with inner tracks, torque-transmitting balls accommodated in pairs of tracks consisting of outer tracks and inner tracks, and a ball cage with cage windows in which the balls are held in a common plane and are guided on to the angle-bisecting plane when the joint is articulated. First outer tracks, together with first inner tracks, form first pairs of tracks which diverge from one another when viewed in a first axial direction towards the connection end of the inner joint part and hold first balls. Second outer tracks, together with second inner tracks, form second pairs of tracks which diverge from one another when viewed in a second axial direction towards the connection end of the outer joint part and hold second balls.

BACKGROUND OF THE INVENTION

Counter-track joints of the above-mentioned type are advantageous in that the balls alternately circumferentially arranged in first pairs of tracks and second pairs of tracks are subjected, via the tracks, to forces which alternately point in a first direction and in a second direction. The forces are accommodated by counter-forces of the ball cage which are balanced in the form of internal forces, so that the cage is not subjected to any external axial forces. The cage thus runs in a relatively friction-free way relative to the outer joint part. Presently, for production and assembly reasons and with reference to the preferred ball sizes, it has been common practice with joints according to the state of the art that opposite a first pair of tracks widening when viewed in a first direction, there is arranged, radially opposite thereto, a second pair of tracks widening when viewed in a second direction, wherein there are provided, more particularly, six pairs of tracks. This design has disadvantages with regard to joint control, i.e. the control force conditions at the cage. However, accurate cage control is desired in order to be able, at any time when the joint is articulated, to guide the balls in their entirety with sufficiently high control forces on to the angle-bisecting plane which symmetrically divides the angle between the axes of the outer joint part and the inner joint part. The reasons for the disadvantageous control conditions in joints according to the state of the art will be explained in greater detail later with reference to several drawings.

SUMMARY OF THE INVENTION

The present invention provides a driveshaft of the initially mentioned type with a counter-track joint with improved control characteristics. The counter-track joint includes first pairs of tracks positioned radially opposite other first pairs of tracks, and second pairs of tracks positioned radially opposite other second pairs of tracks. More particularly, the first pairs of tracks and second pairs of tracks are arranged so as to alternate across the circumference. In another embodiment, a joint with eight uniformly circumferentially distributed pairs of tracks is disclosed. Other joint embodiments include twelve or sixteen pairs of tracks. An inventive driveshaft with such a joint is characterised by a clearly improved service life of the joint which, in particular, is used as a joint at the drive end in a driveshaft consisting of two fixed constant velocity joints and an intermediate shaft with an integrated axial plunging unit. The outer joint part is driven by the differential drive and the inner joint part is connected to the intermediate shaft. The improved service life is due to the resulting control forces which permanently deviate from zero and which are applied by pairs of tracks to the respective opposed pairs of balls, so that, overall, the cage control conditions are much improved. The reasons for such improved control force conditions will be explained with reference to the drawings.

Other advantages and features of the invention will also become apparent upon reading the following detailed description and appended claims, and upon reference to the accompanying drawings.

BRIEF DESCRIPTION OF THE DRAWINGS

For a more complete understanding of this invention, reference should now be made to the embodiments illustrated in greater detail in the accompanying drawings and described below by way of examples of the invention.

In the drawings:

FIG. 3 shows a joint according to FIG. 2, illustrating the axial ball forces:
  A) in a longitudinal section; and
  B) in a developed view of the cage.

FIG. 6 shows a joint according to FIG. 5 illustrating the axial ball forces:
  A) in a longitudinal section; and
  B) in a developed view of the cage.

DETAILED DESCRIPTION OF THE INVENTION

Figure 1:
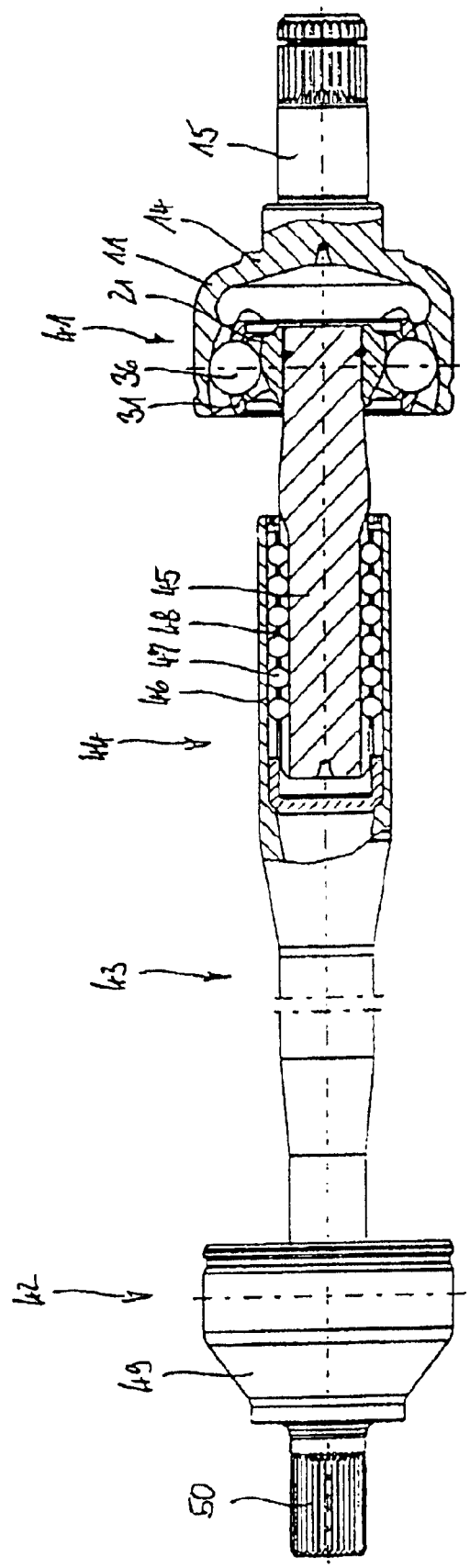
FIG. 1 shows an inventive driveshaft in a partial longitudinal section.

FIG. 1 shows an inventive driveshaft with a first constant velocity fixed ball joint 41 in the form of a counter-track joint, a second constant velocity fixed ball joint 42 and an intermediate shaft 43. The intermediate shaft 43 includes an integrated axial plunging unit 44 which, substantially, comprises a journal 45, a sleeve 46 and torque transmitting balls 47 which are held together by a cage 48. The first constant velocity fixed ball joint 41 comprises an outer joint part 11 with a base 14 and a formed-on journal 15, as well as an inner joint part 21 connected to the journal 45, a ball cage 31 and torque transmitting balls 36. The joint and thus the entire driveshaft are driven by the journal 15 via the outer joint part 11. The journal 15 is inserted into a differential drive, for example. The second constant velocity fixed ball joint 42 is arranged in such a way that output is effected via a journal 50 which is connected to its outer joint part 49 and to a wheel hub, for example.

Figure 2A:
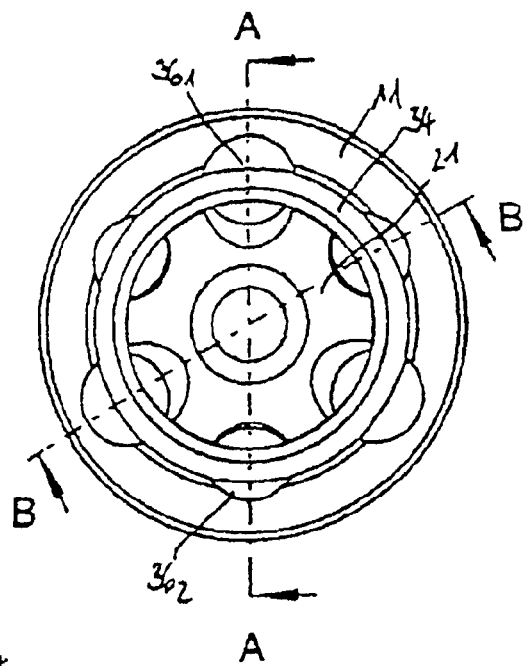
FIG. 2 shows a counter-track joint according to the state of the art:
  A) in an axial view of the joint aperture;
  B) in a longitudinal section according to the sectional plane A—A; and
  C) in a longitudinal section according to the sectional plane B—B.
Figure 2B:
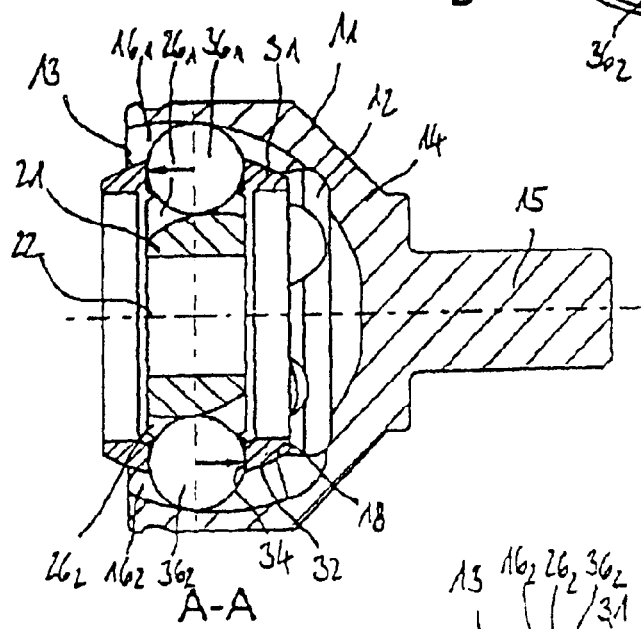
Figure 2C:
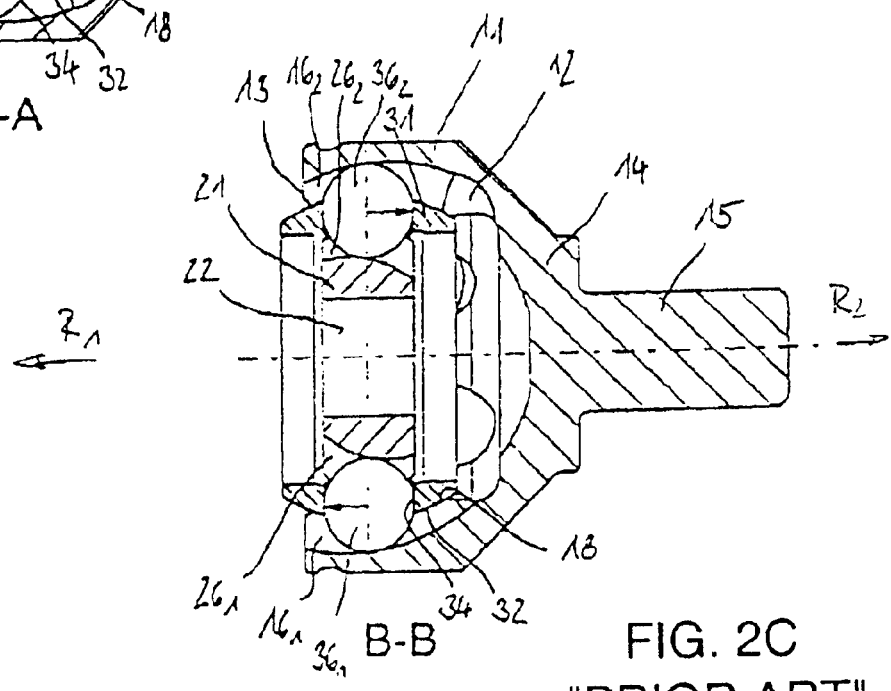

FIG. 2 shows a counter-track joint according to the state of the art. The illustrations of FIG. 2 will be described jointly below. An outer joint part 11 comprises an interior 12 with an aperture 13 and an opposed base 14. A connecting journal 15 is formed on to the base 14. The interior 12 accommodates an inner joint part 21 with an inner aperture 22 for inserting a shaft journal. A ball cage 31 is arranged between the outer joint part 11 and the inner joint part 21. The joint comprises first outer tracks $16_1$ and first inner tracks $26_1$ which diverge from one another when viewed in a first direction $R_1$ which points from the joint center to the aperture end of the outer joint part. Furthermore, the joint comprises second outer tracks $16_2$ and second inner tracks $26_2$ which diverge from one another when viewed in a second direction $R_2$ which, from the joint center, points towards the journal end of the outer joint part. First outer tracks $16_1$ and first inner tracks $26_1$ form first pairs of tracks with one another; second outer tracks $16_2$ and second inner tracks $26_2$ form second pairs of track with one another. The pairs of tracks consisting of inner tracks and outer tracks accommodate torque transmitting balls $36_1$, $36_2$. The ball cage 31 comprises a spherical outer face 32 which is held in a spherical inner face 18 of the outer joint part. The balls are held in windows 34 of the cage 31. In each radial section through ball tracks through the entire joint, first pairs of tracks $16_1$, $26_1$ and second pairs of tracks $16_2$, $26_2$ are positioned opposite one another as it can be seen in section A—A of FIG. 2B and section B—B of FIG. 2C. The balls $36_1$ in the first pairs of tracks are subjected by the tracks to forces which point in the first direction $R_1$. The balls $36_2$ in the second pairs of tracks are subjected by the tracks to forces which point in the second direction $R_2$. In each case, this applies to torque transmitting conditions and leads to an internal load being applied to the cage. However, as the forces are balanced in pairs, the cage, overall, is held so as to be axially force-free relative to the outer joint part 11 and the inner joint part 21. As a result, the friction forces between the cage and outer joint part are low when the assembled joint rotates.

In FIG. 3, the forces applied to the balls $36_1$, $36_2$ by the pairs of tracks $16_1$, $26_1$, $16_2$, $26_2$ are illustrated for four balls, and the developed view of the cage 34 shows the respective counter forces which act on the balls and which have to be applied by the cage. With a total of six forces which act alternately in opposite directions, the cage 34 is outwardly force-free relative to the outer joint part 11 and the inner joint part 21.

Figure 4A:
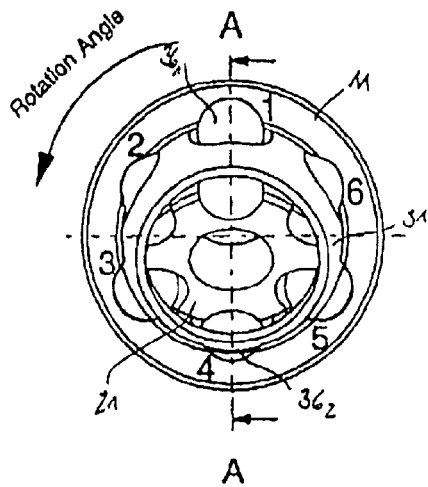
FIG. 4 shows a joint according to FIG. 2 rotating in an articulated condition:
  A) in an axial view;
  B) in a longitudinal section;
  C) in the form of a detail with cage and balls; and
  D) in an illustration of the control angle for two opposed balls.
Figure 4B:
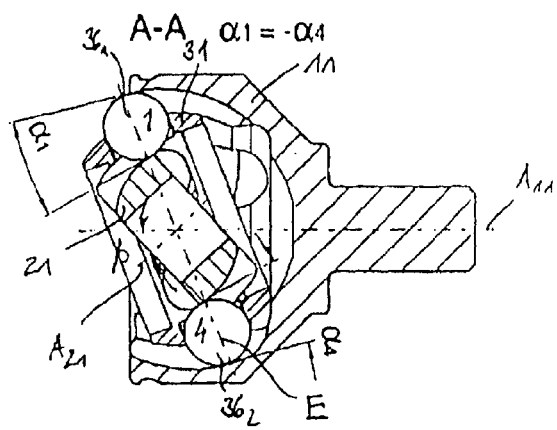
Figure 4C:
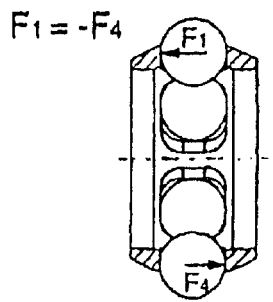
Figure 4D:
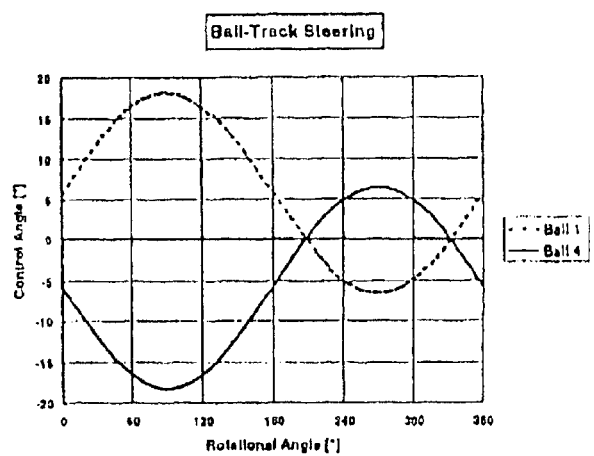

The individual illustrations of FIG. 4 will be described jointly below. The joint according to FIG. 4 is shown in an articulated condition, with an articulation angle β being set between the axis $A_{11}$ of the outer joint part 11 and the axis $A_{21}$ of the inner joint part 21. The angle between the axes $A_{11}$, $A_{21}$ is divided symmetrically by the angle bisecting plane E. FIG. 4B is a longitudinal section through the so-called articulation plane spanned by the axes $A_{11}$, $A_{21}$. The balls are continuously numbered from 1 to 6, with the balls 1 and 4 being positioned in the articulation plane. In the points of contact between the balls 1 and 4 and the ball tracks, tangents have been drawn against the balls. The tangents at the ball 1 enclose a control angle $\alpha_1$ and the tangents at the ball 4 enclose a control angle $\alpha_4$ which, for reasons of symmetry, is of the same size. It is necessary to provide control angles which differ from zero, so that, upon articulation of the axes $A_{11}$, $A_{21}$, the ball tracks apply forces to the balls to enable same to control the cage on to the angle bisecting plane E. It is permissible for the control forces at individual balls to be zero if high control forces are applied to other balls. FIG. 4D shows, quantitatively, for the balls 1 and 4 the control angles $\alpha_1$, $\alpha_4$ across one joint rotation with axes $A_{11}$, $A_{21}$ which are in a fixed position relative to one another. The illustration shows that, twice across the circumference, specifically at rotational angles of 210° and 330°, the control angles of the balls 1 and 4 become zero simultaneously. Thus, according to FIG. 4C, also the forces $F_1$ and $F_4$ which, outside the angular position, form a pair of forces generating a tilting moment onto the cage, become zero. Even if one takes into account that two further pairs of balls, with offset phases, act with pairs of forces deviating from zero, the cage control is relatively unsatisfactory.

Figure 5A:
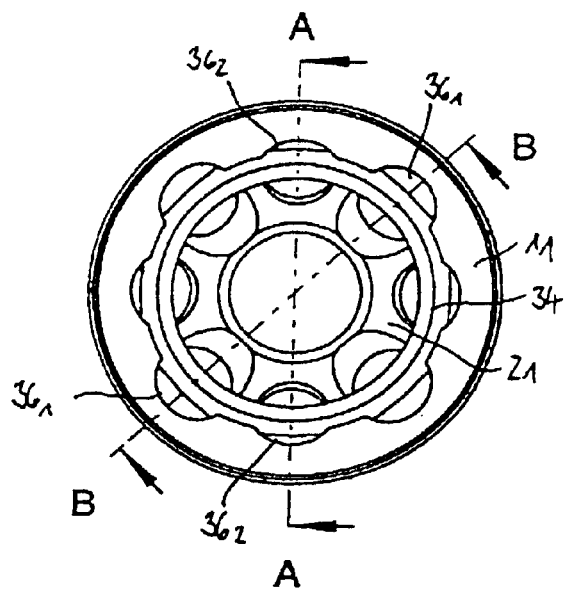
FIG. 5 shows a counter-track joint of a driveshaft in accordance with the invention:
  A) in an axial view of the joint aperture;
  B) in a longitudinal section according to the sectional plane A—A; and
  C) in a longitudinal section according to the sectional plane B—B.
Figure 5B:
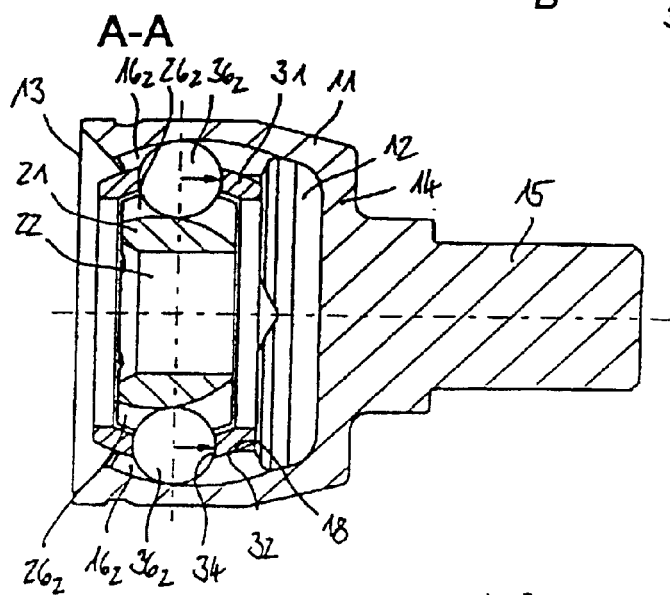
Figure 5C:
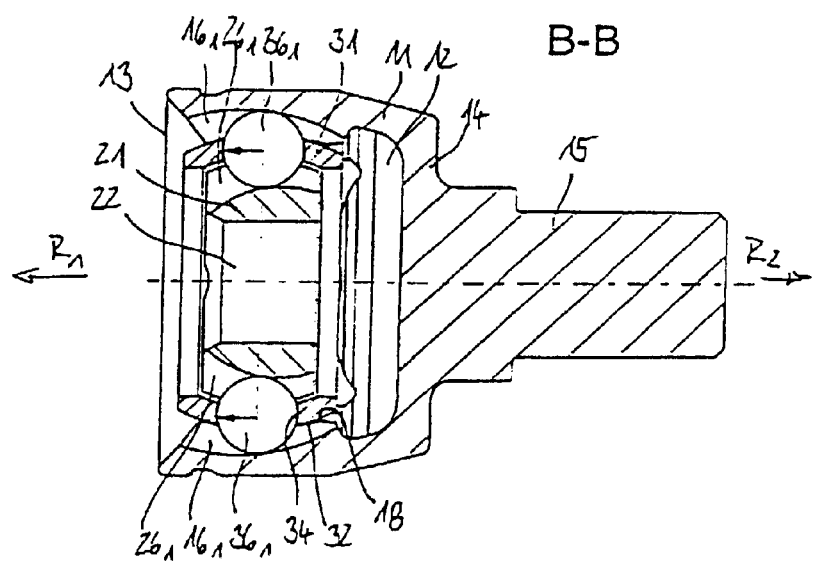

The illustrations of FIG. 5 will be described jointly below. Similar parts to those described with respect to FIGS. 2 and 4 have been indexed by 100. An outer joint part 111 comprises an interior 112 with an aperture 113 and an opposed base 114. A connecting journal 115 is formed on to the base 114. The base 114 may be an integrally formed-on portion of the outer joint part 111. The interior 112 contains an inner joint part 121 with an inner aperture 122 for inserting a shaft journal. Between the outer joint part 111 and the inner joint part 121, there is arranged a ball cage 131. The joint comprises first outer tracks $16_1$ and first inner tracks $126_1$ which diverge from one another when viewed in a first direction $R_1$ which points from the joint center to the aperture end of the outer joint part. Furthermore, the joint comprises second outer tracks $116_2$ and second inner tracks $126_2$ which diverge from one another when viewed in a second direction $R_2$ which, from the joint center, points towards the journal end of the outer joint part. First outer tracks $116_1$ and first inner tracks $126_1$ form first pairs of tracks with one another. Second outer tracks $116_2$ and second inner tracks $126_2$ form second pairs of tracks with one another. The first pairs of tracks ($116_1$, $126_1$) and the second pairs of tracks ($116_2$, $126_2$) can be alternately arranged around the circumference of the counter-track joint as shown in FIG. 5C. The pairs of tracks formed of inner tracks and outer tracks accommodate torque transmitting balls $136_1$, $136_2$. The ball cage 131 comprises a spherical outer face 132 which is held in a spherical inner face 118 of the outer joint part. The balls are held in the windows 134 of the cage 131. The ball cage 131 and windows 134 hold the balls $136_1$, $136_2$ in a common plane and guide them on to the angle-bisecting plane when the joint is articulated. The joint of FIG. 5 includes eight balls. In radial sections through ball tracks through the entire joint, first pairs of tracks are positioned opposite other first pairs of tracks, as can be seen in section B—B of FIG. 5C, or second pairs of tracks are positioned opposite other second pairs of tracks, as can be seen in section A—A of FIG. 5B. The balls $136_1$ in the first pairs of tracks $116_1$, $126_1$ are subjected by the tracks to forces which point in the first direction $R_1$. The balls $136_2$ in the second pairs of tracks $116_2$, $126_2$ are subjected by the tracks to forces which point in the second direction $R_2$. This applies to torque transmitting conditions and leads to an internal load being applied to the cage. However, as the forces are balanced in pairs, the cage, overall, is held in the outer joint part in a condition where it is axially force-free. As a result, the friction forces between the cage and the outer joint part are low when the assembled joint rotates.

In FIG. 6, in a sectional view, the forces applied to the balls by the pairs of tracks are illustrated for five balls, and the developed view of the cage shows the respective counter forces which act on the balls and which have to be applied by the cage. With a total of eight forces which act alternately in opposite directions, the cage is outwardly force-free. The present invention similarly contemplates joints with twelve or sixteen pairs of tracks.

Figure 7A:
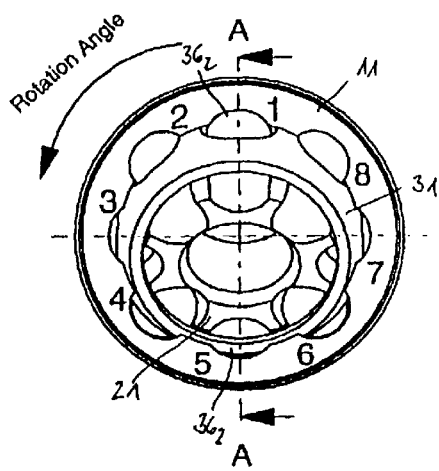
FIG. 7 shows a joint according to FIG. 5 rotating in an articulated condition:
  A) in an axial view;
  B) in a longitudinal section;
  C) in the form of a detail with cage and balls; and
  D) in an illustration of the control angle for two opposed balls.
Figure 7B:
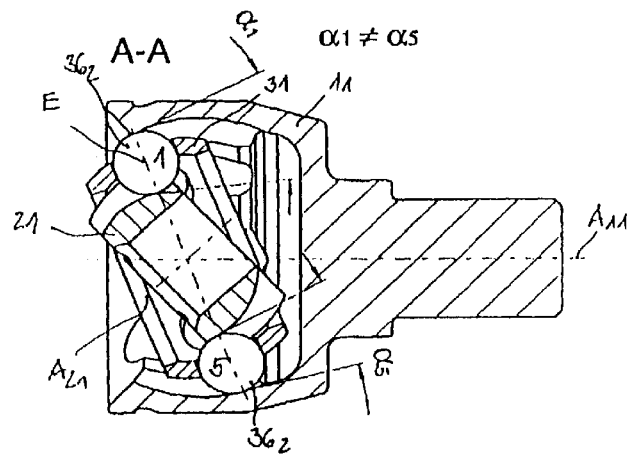
Figure 7C:
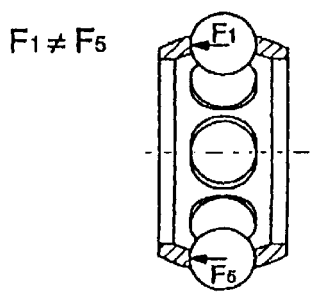
Figure 7D:
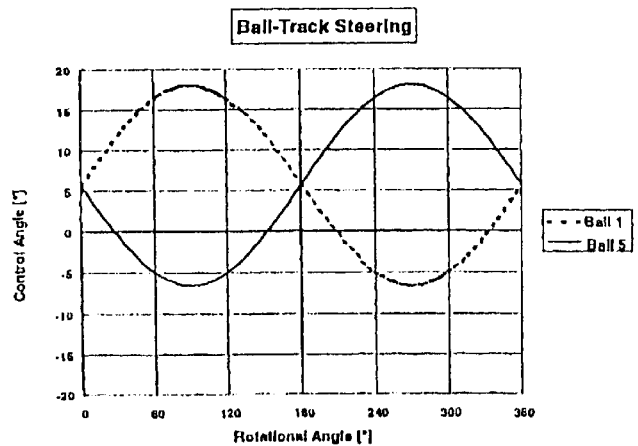

The individual Illustrations of FIG. 7 will be described jointly below. A joint according to FIG. 6 is shown in an articulated condition, with an articulation angle β being set between the axis $A_{11}$ of the outer joint part 111 and the axis $A_{21}$ of the inner joint part 121. The angle between the axes $A_{111}$, $A_{121}$ is symmetrically divided by the angle-bisecting plane E. FIG. 7B is a longitudinal section through the so-called articulation plane spanned by the axes $A_{111}$, $A_{121}$. The balls are continuously numbered from 1 to 8, with the balls 1 and 5 being positioned in the articulation plane. In the paints of contact between the balls 1 and 5 and the ball tracks, tangents have been drawn against the balls. The tangents at the ball 1 enclose a control angle $\alpha_1$ and the tangents at the ball 5 enclose a control angle $\alpha_5$ which, according to the invention are of different size. It is necessary to provide control angles which differ from zero, so that, upon articulation of the axes $A_{111}$, $A_{121}$, the ball tracks apply forces to the balls to enable same to control the cage on to the angle-bisecting plane E. It is permissible for the control forces at individual balls to be zero if high control forces are applied to other balls. FIG. 7D shows, quantitatively, for the balls 1 and 5 said control angle $\alpha_1$, $\alpha_5$ across one joint rotation with axes $A_{111}$, $A_{121}$ which are in a fixed position relative to one another. The illustration shows that, for each of the balls 1 and 5, twice across the circumference, i.e. at rotational angles of 30° and 150°, the control angle $\alpha_1$ for the ball 1 and at rotational angles 210° and 330°, the control angle $\alpha_5$ for the ball 5 becomes zero, but the control angle of the respective ball positioned radially opposite always deviates from zero. Thus, also the pair of forces formed by the forces $F_1$ and $F_5$, which generates a tilting moment onto the cage, constantly deviates from zero. As a result, the cage control is extremely advantageous at all angles of rotation.

Figure 8:
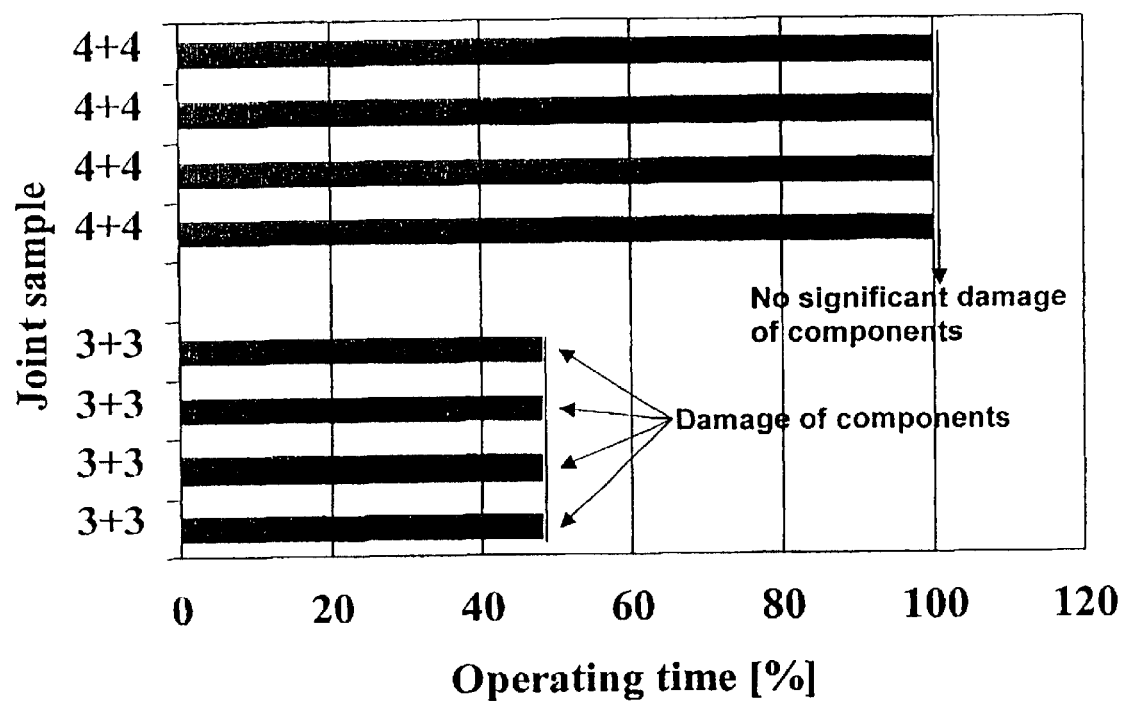
FIG. 8 shows the service life of counter-track joints in driveshafts in accordance with the invention as compared to the state of the art.

In FIG. 8, in four tests, the service life of a driveshaft in accordance with the invention with a constant velocity fixed ball joint with eight balls in eight pairs of tracks is compared to the service life of a driveshaft with a constant velocity fixed ball joint with six balls in six pairs of tracks. All the inventive driveshafts with joints with eight balls have reached the nominal service life of 100%, whereas the driveshafts with joints with six balls each achieved less then 50% of the nominal service life. The joints with eight balls corresponded to those according to FIGS. 5 to 7, whereas said joints with six balls corresponded to those shown in FIGS. 2 to 4.

While the invention has been described in connection with one or more embodiments, it should be understood that the invention is not limited to those embodiments. Thus, the invention covers all alternatives, modifications, and equivalents as may be included in the spirit and scope of the appended claims.

What is claimed is:

1. A driveshaft having two constant velocity joints and an intermediate shaft, wherein at least one of the joints is a constant velocity fixed bail joint in the form of a counter-track joint, the joint comprising:

an outer joint part with outer tracks;

an inner joint part with inner tracks;

torque-transmitting balls accommodated in pairs of tracks; and a ball cage with cage windows in which the balls are held in a common plane and are guided on to the angle-bisecting plane when the joint is articulated, wherein first outer tracks, together with first inner tracks, form first pairs of tracks which diverge from one another viewed in a first axial direction ($R_1$) towards a connection end of the inner joint part and hold first balls, wherein second outer tracks, together with second inner tracks, form second pairs of tracks which diverge from one another in a second axial direction ($R_2$) towards a connection end of the outer joint part and hold second balls, wherein said first axial direction ($R_1$) is opposite to said second axial direction ($R_2$), wherein first pairs of tracks are positioned radially opposite other first pairs of tracks and second pairs of tracks are positioned radially opposite other second pairs of tracks, wherein, in said counter-track joint, first pairs of tracks and second pairs of tracks are alternately arranged around the circumference of the counter-track joint, and wherein the counter-track joint comprises eight pairs of tracks.

2. A driveshaft according to claim 1, wherein, at its connection end, the outer joint part of said counter-track joint comprises an integrally formed-on joint base.

3. A driveshaft according to claim 2, wherein, at its connection end, the inner joint part of said counter-track joint is connected to the intermediate shaft of the driveshaft.

4. A driveshaft according to claim 2, wherein the intermediate shaft comprises an axial displacement unit.

5. A driveshaft according to claim 1, wherein, at its connection end, the inner joint part of said counter-track joint is connected to the intermediate shaft of the driveshaft.

6. A driveshaft according to claim 5, wherein the intermediate shaft comprises an axial displacement unit.

7. A driveshaft according to claim 1, wherein the intermediate shaft comprises an axial displacement unit.

8. A driveshaft assembly comprising:

an intermediate shaft;

a first constant velocity joint connected to one end of the intermediate shaft; and a second constant velocity fixed ball joint in the form of a counter-track joint connected to the other end of the intermediate shaft, the counter-track joint comprising an outer joint part having first and second outer tracks, an inner joint part having first and second inner tracks, and a ball cage with cage windows in which torque-transmitting balls are held in a common plane and are guided on to an angle-bisecting plane when the joint is articulated, said first outer tracks and first inner tracks forming first pairs of tracks which diverge from one another in a first axial direction ($R_1$) towards the connection end of the inner joint part and hold first balls, said second outer tracks and second inner tracks forming second pairs of tracks which diverge from one another in a second axial direction ($R_2$) towards the connection end of the outer joint part and hold second balls, wherein said first axial direction ($R_1$) is opposite to said second axial direction ($R_2$), wherein each first pair of tracks is radially opposite another first pair of tracks and each second pair of tracks is radially opposite another second pair of tracks, wherein the first pairs of tracks and second pairs of tracks are circumferentially alternately arranged around the counter-track joint, and wherein the counter-track joint comprises four each of said first and second pairs of tracks.

9. A driveshaft assembly according to claim 8 wherein the intermediate shaft comprises an axial displacement unit.

10. A driveshaft assembly according to claim 8 wherein the outer joint part comprises an integrally formed-on joint base, and said inner joint part is connected to the intermediate shaft.

* * * * *